United States Patent
Yamamoto et al.

(10) Patent No.: US 10,810,819 B2
(45) Date of Patent: Oct. 20, 2020

(54) SERVER DEVICE, PROGRAM, METHOD, AND TERMINAL DEVICE

(71) Applicant: GungHo Online Entertainment, Inc., Tokyo (JP)

(72) Inventors: Daisuke Yamamoto, Tokyo (JP); Shinichi Kudo, Tokyo (JP); Atsuo Kamiya, Tokyo (JP); Koichiro Kobinata, Tokyo (JP)

(73) Assignee: GungHo Onling Entertainment, Inc. (JP)

( * ) Notice: Subject to any disclaimer, the term of this patent is extended or adjusted under 35 U.S.C. 154(b) by 49 days.

(21) Appl. No.: 16/127,781

(22) Filed: Sep. 11, 2018

(65) Prior Publication Data

US 2019/0279452 A1    Sep. 12, 2019

Related U.S. Application Data (63) Continuation of application No. PCT/JP2018/008995, filed on Mar. 8, 2018.

(51) Int. Cl.
*G07C 15/00* (2006.01)
*A63F 3/06* (2006.01)
*G06K 7/14* (2006.01)

(52) U.S. Cl.
CPC .......... *G07C 15/006* (2013.01); *A63F 3/0605* (2013.01); *G06K 7/1417* (2013.01)

(58) Field of Classification Search
CPC ....................................................... A63F 9/24
See application file for complete search history.

(56) References Cited

U.S. PATENT DOCUMENTS

| | | | | |
|---|---|---|---|---|
| 2010/0304828 | A1* | 12/2010 | Bettcher | A63F 3/081 463/17 |
| 2011/0165933 | A1* | 7/2011 | Guziel | A63F 3/0645 463/17 |
| 2018/0293834 | A1* | 10/2018 | Cage | G07F 17/329 |

FOREIGN PATENT DOCUMENTS

| | | |
|---|---|---|
| JP | 2002-041704 A | 2/2002 |
| JP | 2005-049973 A | 2/2005 |
| JP | 2010-039951 A | 2/2010 |
| JP | 2010-108059 A | 5/2010 |
| JP | 2014-157581 A | 8/2014 |

* cited by examiner

*Primary Examiner* — Reginald A Renwick
(74) *Attorney, Agent, or Firm* — Harness, Dickey & Pierce, P.L.C.

(57) ABSTRACT

A server device including: a memory configured to store lottery information, winning information, and computer-readable instructions; and a processor. The lottery information is obtained by conversion processing for input information that is input via an input interface in a terminal device of a user. The winning information is a predetermined character string. The processor is configured to execute the computer readable instructions to determine whether the lottery information matches the winning information, to create lottery result information, and to transmit the lottery result information to the terminal device according to the determination.

20 Claims, 9 Drawing Sheets

| WINNING ID | BONUS | MAXIMUM NUMBER OF WINNERS | CUMULATIVE NUMBER OF WINNERS | ELAPSED TIME | WINNING INFORMATION ||||
|---|---|---|---|---|---|---|---|---|
| | | | | | WINNING NUMBER 1 | WINNING NUMBER 2 | WINNING NUMBER 3 | ... | WINNING NUMBER X |
| D1 | C1 | 3 | 0 | T1 | P1-1 | - | - | ... | - |
| D2 | C2 | 10 | 3 | T2 | P2-1 | P2-2 | P2-3 | ... | P2-x |
| D3 | C3 | 3 | 2 | T3 | P3-1 | P3-2 | - | ... | - |
| D4 | C4 | 5 | 4 | T4 | P4-1 | - | - | ... | - |
| D5 | C5 | 20 | 0 | T5 | P5-1 | P5-2 | P5-3 | ... | - |
| ⋮ | ⋮ | ⋮ | ⋮ | ⋮ | ⋮ | ⋮ | ⋮ | ... | ⋮ |

FIG. 5B

| USER ID | USER NAME | NUMBER OF LOTTERIES |
|---|---|---|
| U1 | A | 5 |
| U2 | B | 0 |
| U3 | C | 10 |
| U4 | D | 3 |
| U5 | E | 8 |
| ⋮ | ⋮ | ⋮ |

SERVER DEVICE, PROGRAM, METHOD, AND TERMINAL DEVICE

CROSS-REFERENCE TO RELATED APPLICATIONS

The present application is a continuation application of International Application No. PCT/JP2018/008995, filed on Mar. 8, 2018, which is expressly incorporated herein by reference in its entirety.

BACKGROUND

1. Technical Field

The present disclosure relates to a server device, a program, a method, and a terminal device used for determining presence or absence of winning on the basis of lottery information obtained by performing predetermined conversion processing for arbitrary input information.

2. Related Art

Conventionally, a system to conduct lottery by affixing a two-dimensional barcode on a surface of a product or the like and reading the two-dimensional barcode in a dedicated application is known. JP 2014-157581 A describes a system to conduct lottery by reading lottery information printed on a lottery medium affixed to a product with a reading terminal to allow the reading terminal to access a specific web page that indicates presence or absence of winning.

SUMMARY

Therefore, in view of the above-described technologies, the present disclosure provides a server device, a program, a method, and a terminal device, which make more various types of information usable in lottery.

According to one aspect of the present disclosure, there is provided "a server device comprising: a memory configured to store lottery information obtained by performing predetermined conversion processing for arbitrary input information input through an input interface in a terminal device held by a user, winning information that is a predetermined character string determined in advance, and computer-readable instructions; and a processor configured to execute the computer readable instructions so as to: determine whether the lottery information stored in the memory matches the winning information stored in the memory, and perform processing for transmitting lottery result information to the terminal device to which the input information has been input according to the determination".

According to one aspect of the present disclosure, there is provided "a computer program product embodying computer-readable instructions stored on a non-transitory computer readable storage medium for causing a computer to execute a process by a processor, the computer including a memory configured to store lottery information obtained by performing predetermined conversion processing for arbitrary input information input through an input interface in a terminal device held by a user, winning information that is a predetermined character string determined in advance, the computer configured to perform the step of: determining whether the lottery information stored in the memory matches the winning information stored in the memory on the basis of the instruction command, and performing processing for transmitting lottery result information to the terminal device to which the input information has been input according to the determination".

According to one aspect of the present disclosure, there is provided "a method for causing a processor in a computer to execute a process, the computer including a memory configured to store lottery information obtained by performing predetermined conversion processing for arbitrary input information input through an input interface in a terminal device held by a user, winning information that is a predetermined character string determined in advance, and computer-readable instructions, the method comprising executing the computer-readable instructions on the processor the step of: determining whether the lottery information stored in the memory matches the winning information stored in the memory, and performing processing for transmitting lottery result information to the terminal device to which the input information has been input according to the determination".

According to one aspect of the present disclosure, there is provided "a terminal device comprising: an input interface configured to input arbitrary input information; a memory configured to store computer-readable instructions; a communication interface configured to transmit and receive predetermined information; and a processor configured to execute the computer-readable instructions so as to: predetermining conversion processing for the arbitrary input information input to the input interface on the basis of the computer-readable instructions, transmitting the arbitrary input information for which the conversion processing has been made to a server device communicatively connected via the communication interface, and performing processing for receiving, from the server device, lottery result information according to determination as to whether winning information stored in advance in the server device matches lottery information obtained on the basis of the arbitrary input information for which the conversion processing has been made".

According to various embodiments of the present disclosure, a server device, a program, a method, and a terminal device, which make more various types of information usable in lottery can be provided.

Note that the above-described effect is simply an example provided for illustrative purposes only, and is not restrictive for convenience of description. Any effect described in the present disclosure or an apparent effect for a person skilled in the art can be exhibited in addition to or in place of the above-described effect.

DESCRIPTION OF EXEMPLARY EMBODIMENTS

Various embodiments of the present disclosure will be described with reference to the appended drawings. Note that the configuration element common in the drawings is denoted with the same reference sign.

Outline of System According to Present Disclosure

In a system according to various embodiments of the present disclosure, when input information is read through an input interface of a terminal device held by a user, predetermined conversion processing is performed for the read input information in the terminal device or a server device, and lottery information is obtained. Then, the obtained lottery information is compared with winning information stored in advance, and a bonus is given to the user when the lottery information and the winning information match each other.

As an example, a URL of a web site recorded in a two-dimensional barcode affixed to a container of a product is read through a camera of the terminal device held by the user, and conversion processing based on a hash function is performed for a character string of the read URL and fixed-length character information is obtained Then, conversion processing is further performed for the obtained character string in accordance with a rule determined in advance and fixed-length numerical information is obtained. In the server device, it is determined whether the obtained numerical information matches a winning number stored in advance in the server or not, and when they match each other, a new user character is given to the user who has read the two-dimensional barcode as a bonus.

In various embodiments of the present disclosure, the predetermined conversion processing is performed for an arbitrary character string read from the two-dimensional barcode, and the read arbitrary character string is converted into lottery information usable for determination of presence or absence of winning. Therefore, it is not necessary to record the lottery information to a two-dimensional barcode for determination of presence or absence of winning and to distribute the two-dimensional barcode to users. In other words, to guide a purchaser of the product to the web site of product information, a two-dimensional barcode distributed for a completely different purpose, such as a two-dimensional barcode affixed to the container of the product can be used as the lottery information according to the system of the present disclosure.

Figure 1A:
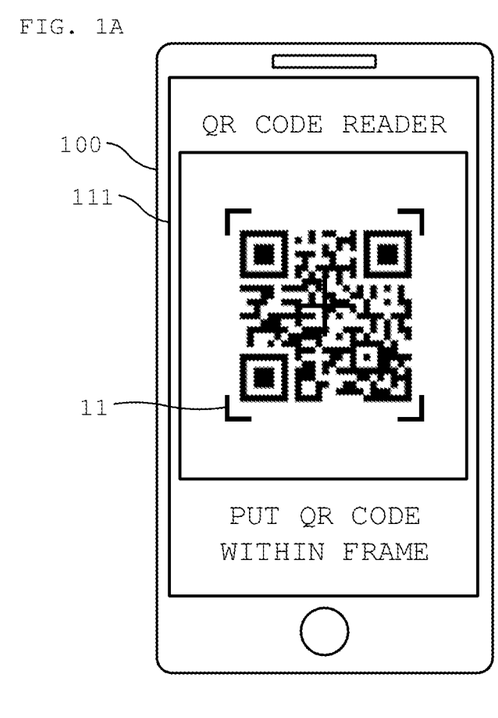
FIG. 1A is a diagram conceptually illustrating an application executed in a system according to various embodiments of the present disclosure. Further.

FIG. 1A is a diagram conceptually illustrating an application executed in a system according to various embodiments of the present disclosure. To be specific, FIG. 1A illustrates an example of a screen displayed on a terminal device 100 when the system according to various embodiments of the present disclosure is carried out. According to FIG. 1A, when the user starts an application for reading arbitrary input information (for example, a two-dimensional barcode) in the terminal device 100, an input interface (for example, a camera) is turned on and the arbitrary input information is read. In FIG. 1A, an indicator 11 for instructing, to the user, an imaging position with the camera is displayed on a screen after the start of the application on a display 111 of the terminal device 100.

Figure 1B:
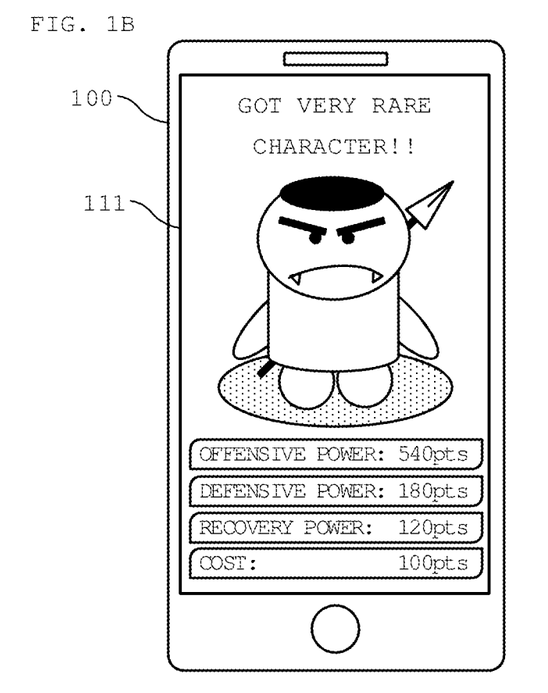
FIG. 1B is a diagram conceptually illustrating an application executed in a system according to various embodiments of the present disclosure.

FIG. 1B conceptually illustrates the application executed in the system according to various embodiments of the present disclosure. To be specific, FIG. 1B illustrates an example of a screen displayed on the terminal device 100 when the system according to various embodiments of the present disclosure is carried out. According to FIG. 1B, the conversion processing is performed for the read input information and the lottery information is obtained, and a result of determination of winning performed by the server device on the basis of the lottery information is displayed on the display 111 of the terminal device 100. The example of FIG. 1B indicates that a character displayed on the display 111 has been given as a bonus, as a result of the determination.

Note that, in various embodiments of the present disclosure, the input information is not limited to the information recorded in a two-dimensional barcode and various types of information can be used as the input information. For example, any character string such as a character string included in a one-dimensional barcode, a newspaper, a magazine, a web page, a document, or the like, an arbitrary character string input by the user to the terminal device, a character string included in a signboard, a sign, or the like, or a speech-recognized character string can be used. That is, the input information does not need to be information issued by a provider of the system or the application according to various embodiments of the present disclosure and may be information issued by another provider including the user himself/herself.

Further, in various embodiments of the present disclosure, the input interface for reading the input information is not limited to the camera and various interfaces can be used as the input interface. Examples of the input interface include an infrared sensor, an acceleration sensor, a touch panel, a hardware key, a microphone, and a communication interface using short-distance/long-distance wireless communication.

Further, in various embodiments of the present disclosure, the conversion processing based on a hash function is performed for the input information, and the input information in which the number of characters, the character type, and the like have arbitrary formats is converted into the fixed-length character string. However, this conversion processing is not limited to the conversion processing based on a hash function as long as the conversion processing can convert the input information in an arbitrary format into fixed-length data that always have the same value for the same data in at least one direction, and any of known conversion methods can be used. Further, in various embodiments of the present disclosure, after the input information is converted into the fixed-length character string on the basis of the hash function in the terminal device, the server device further performs processing of converting the fixed-length character string into a fixed-length sequence (8 digits) to obtain the lottery information. However, the conversion processing may be performed only in the terminal device or in the server device or a plurality of times of the conversion processing may be performed in each device as long as a character string usable for determination of presence or absence of winning can be finally obtained. Note that, for countermeasures against fraud, it is desirable to perform the conversion processing at least once in the server device.

Further, in various embodiments of the present disclosure, the application executed in the terminal device may be any application as long as the application has a function to read the input information. That is, the application may be an application dedicated to the function to read the input information or may be an application in which the function is partially incorporated. Examples of the dedicated application include a barcode reader application, an OCR application, and a voice recognition application. Further, examples of the application in which the function is partially incorporated include an SNS application, a browser application, a game application, and a mail application.

Further, in various embodiments of the present disclosure, the bonus or bonus information is not limited to the character usable in the game application or the like and various items can be used as the bonus. For example, any item can be used, such as an electronic coupon usable on a specific web page or an online shopping site, a virtual item usable in the game application such as an electronic money or a point, or a product distributed in the real world such as virtual currency.

Further, in various embodiments of the present disclosure, the determination of presence or absence of winning is performed by comparing the obtained lottery information with the winning information stored in advance. At this time, "match" does not mean only that the lottery information completely matches the winning information but may also include a case where the character string included in the lottery information partially matches the character string included in the winning information, a case where the character string included in the lottery information matches the character string included in the winning information in random order, a case where the order of the character string included in the lottery information matches the order of the character string included in the winning information, and the like.

Further, in various embodiments of the present disclosure, fixed-length sequence information or sequence information composed of a predetermined number of digits is used as the obtained lottery information and the winning information stored in advance. However, the obtained lottery information and the winning information stored in advance are not limited to the sequence information. For example, a character string of hiragana, katakana, kanji, or alphabet, or a combination thereof can be used.

First Embodiment

Figure 2:
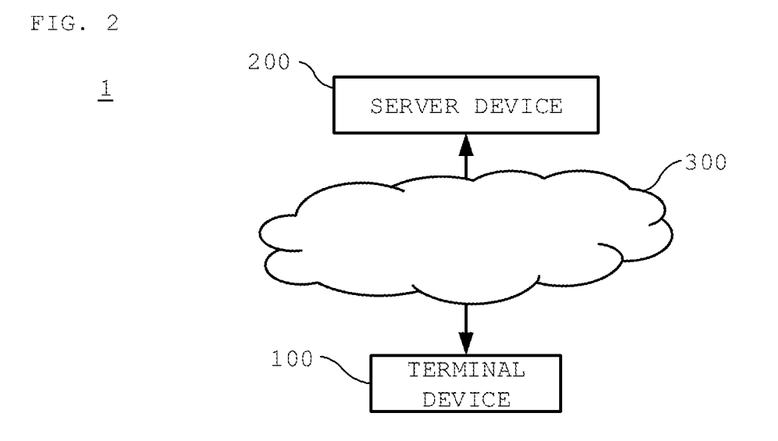
FIG. 2 is a conceptual diagram schematically illustrating a configuration of a system according to a first embodiment of the present disclosure.

1. Configuration of System 1 According to First Embodiment of Present Disclosure FIG. 2 is a conceptual diagram schematically illustrating a configuration of a system 1 according to a first embodiment of the present disclosure. Referring to FIG. 2, the system 1 includes the terminal device 100 and a server device 200 communicatively connected to the terminal device 100 via a network 300. The server device 200 and the terminal devices 100 communicate with each other as needed, and transmit/receive various types of information, programs, and the like necessary for progress of the application.

In the example of FIG. 2, only one terminal device 100 is illustrated. However, a plurality of the terminal devices may be connected to the server device 200. Further, the server device 200 is illustrated as a single server device. However, configuration elements and processing of the server device 200 may be able to be distributed to a plurality of server devices. Further, the terminal device 100 and the server device 200 may be able to execute functions other than the function related to execution of the application according to the present embodiment.

Further, in the first embodiment, a case in which information recorded in a two-dimensional barcode is used as input information and a camera is used as an input interface will be described. However, as described above, the input information and the input interface can be obviously replaced with others.

2. Configuration of Terminal Device 100

Figure 3:
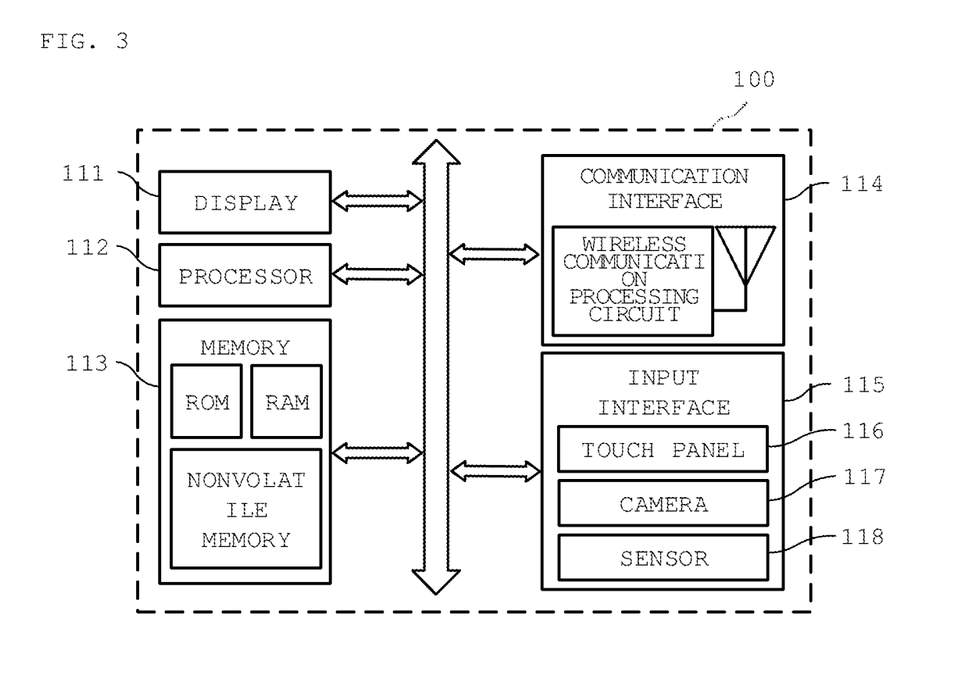
FIG. 3 is a block diagram illustrating an example of a configuration of the terminal device according to the first embodiment of the present disclosure.

FIG. 3 is a block diagram illustrating an example of a configuration of the terminal device 100 according to the first embodiment of the present disclosure. The terminal device 100 does not need to include all the configuration elements illustrated in FIG. 3, and can have a configuration in which a part of the configuration elements is omitted or a configuration to which another configuration element is added.

An example of the terminal device 100 includes a mobile terminal device that can perform wireless communication, represented by a smart phone. However, any terminal device may be employed as long as the terminal device can communicate with the server device 200 and can execute a game application according to the present embodiment, such as a portable game machine, a feature phone, a portable information terminal, a PDA, a laptop personal computer, a desktop personal computer, or a stationary game machine.

According to FIG. 3, the terminal device 100 includes a display 111, a processor 112, a memory 113, a communication interface 114, and an input interface 115 including a touch panel 116, a camera 117, and a sensor 118. Then, these configuration elements are electrically connected with one another through a control line and a data line.

The display 111 functions as a display unit that reads image information stored in the memory 113 and performs various types of display according to an instruction of the processor 112. To be specific, the display 111 displays various types of information such as an image of a two-dimensional barcode recognized by the camera 117, information recorded in the two-dimensional barcode, and a result of lottery, in association with the application according to the present embodiment. The display 111 is configured by a liquid crystal display, for example.

The processor 112 is configured by a CPU (microcomputer), and functions as a control unit that controls connected other configuration elements on the basis of various programs stored in the memory 113. The processor 112 processes instruction commands stored in the memory 113, that is, a program for executing the application according to the present embodiment and a program for executing an OS. To be specific, the processor 112 performs various types of processing including processing for obtaining the input information by recognizing and analyzing information such as an image input through the input interface 115, processing for obtaining the fixed-length character string by converting the obtained input information on the basis of a hash function, and processing for displaying bonus information received from the server device 200. Note that the processor 112 may be configured by a single CPU. However, the processor 112 may be configured by a plurality of CPUs.

Further, the processor 112 may be configured by an appropriate combination of other types of processors such as a GPU that performs image processing.

The memory 113 includes a RAM, a ROM, or a nonvolatile memory (in some cases, an HDD), and functions as a storage unit. The ROM stores the application according to the present embodiment and an instruction command for execution of the OS as programs. The RAM is a memory used to write and read data while the programs stored in the ROM are processed by the processor 112. The nonvolatile memory is a memory in which write and read of data are executed by execution of the programs, and the data written here is saved after the execution of the programs is terminated. In the present embodiment, the memory 113 temporarily stores the input information (information recorded in the two-dimensional barcode) read by the camera.

The communication interface 114 includes a wireless communication processing circuit and an antenna connected to the wireless communication processing circuit, and functions as a communication unit. The communication interface 114 transmits and receives the programs necessary for execution of the application according to the present embodiment, the user information, the lottery information, lottery result information including bonus information, and the like to and from the server device 200 connected via the network 300. The wireless communication processing circuit performs processing such as modulation and demodulation of the information to be transmitted and received.

The communication interface 114 performs processing on the basis of a broadband wireless communication system represented by a wideband-code division multiple access (W-CDMA) system or a long term evolution (LTE) system. However, the processing can be performed on the basis of a wireless LAN represented by IEEE802.11 or a system related to narrowband wireless communication such as Bluetooth (registered trademark).

The communication interface 114 can use wired communication in place of or in addition to wireless communication. In this case, a communication processing circuit for the wired communication may be provided in place of or in addition to a wireless communication processing circuit.

The input interface 115 includes the touch panel 116, the camera 117, and the sensor 118, and functions as an input unit for reading various types of the input information. The touch panel 116 receives various instruction inputs from the user and is used for operation of icons displayed on the display 111, input of a character string by the user, and the like. The touch panel 116 is arranged to cover the display 111, and outputs information of position coordinates touched by an object (a user's finger, a stylus, or the like) corresponding to image data displayed on the display 111. As a touch panel system, a known system such as a resistive film system, an electrostatic capacitive coupling system, or an ultrasonic surface acoustic wave system can be used. The camera 117 includes a known image sensor such as a CCD image sensor or a CMOS image sensor, and images an image of the two-dimensional barcode or the like. The captured image is analyzed by the processor 112 by a known method, and information recognized from the image is read and used as the input information. The sensor 118 includes an infrared sensor or an acceleration sensor, and is used to obtain the input information from an image or a movement of the user recognized using the aforementioned sensor.

3. Configuration of Server Device 200

Figure 4:
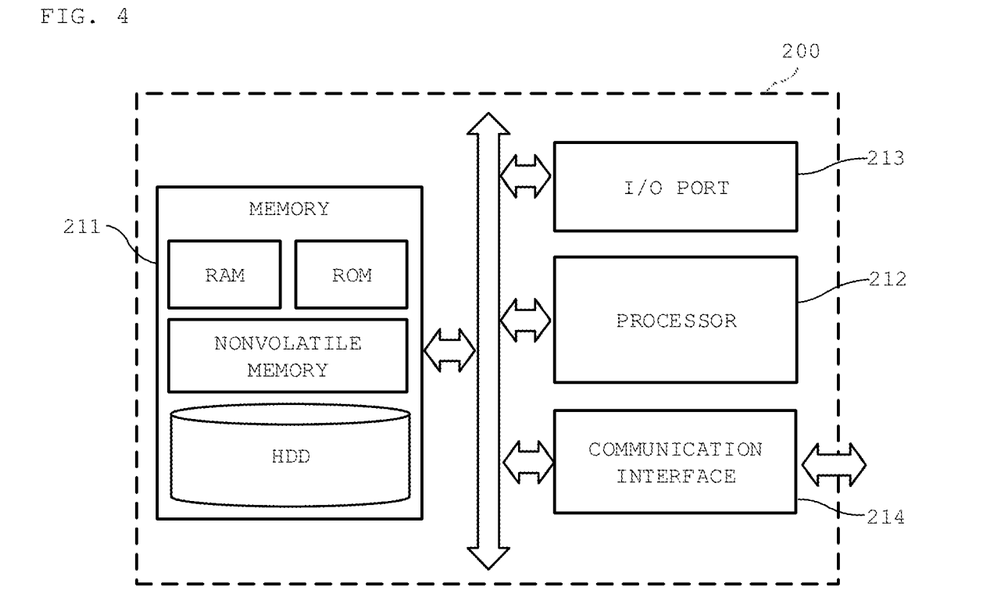
FIG. 4 is a block diagram illustrating an example of a configuration of a server device according to the first embodiment of the present disclosure.

FIG. 4 is a block diagram illustrating an example of a configuration of the server device 200 according to the first embodiment of the present disclosure. The server device 200 does not need to include all the configuration elements illustrated in FIG. 4, and can have a configuration in which a part of the configuration elements is omitted or a configuration to which another configuration element is added.

According to FIG. 4, the server device 200 includes a memory 211 including a RAM, a ROM, a nonvolatile memory, and an HDD, a processor 212 configured by a CPU and the like, an I/O port 213, and a communication interface 214 including a communication processing circuit. Then, these configuration elements are electrically connected with one another through a control line and a data line.

The memory 211 includes the ROM, the RAM, the nonvolatile memory, and the HDD, and functions as a storage unit. Then, the memory 211 stores the application according to the present embodiment and an instruction command for execution of the OS as programs. Such programs are loaded and executed by the processor 212. Further, the memory (particularly RAM) is temporarily used to execute write and read of data while the programs are executed by the processor 212. In the present embodiment, as an example, the memory 211 stores lottery information obtained by performing the conversion processing for the input information, a winning information table (FIG. 5A) used for execution of the application, and a user information table (FIG. 5B: a character name operable by the user, a level, an offensive power, and a defensive power of the character, and the like, in addition to a user name, a user ID, and the number of lotteries).

The processor 212 is configured by a CPU (microcomputer), and functions as a control unit that executes the instruction commands stored in the memory 211, that is, various programs, to control the connected other configuration elements. The processor 212 performs authentication processing with reference to the user information upon receiving user identification information from the terminal device 100, and performs processing of transmitting the user information necessary for execution of the game application to the terminal device 100. To be specific, the processor 212 performs the processing of determining whether the lottery information stored in the memory matches the winning information stored in the winning information table, processing of transmitting the bonus information to the terminal device 100 according to a result of the determination, processing of converting the input information into the fixed-length character string to obtain the lottery information, and the like on the basis of the instruction commands stored in the memory 211. Note that the processor 212 may be configured by a single CPU. However, the processor 212 may be configured by a plurality of CPUs.

The communication interface 214 performs processing such as modulation and demodulation in order to transmit and receive the programs for execution of the application according to the present embodiment and various types of information to and from the terminal device 100 via the network 300, or to and from another server device via the network 300. The communication interface 214 communicates with the terminal devices or another server device according to a known wireless communication system or a known wired communication system. In the present embodiment, as an example, the communication interface 214 executes processing for transmitting the user information, the lottery result information, and the like according to the processor 212.

The I/O port 213 functions as an information input/output unit for inputting/outputting information from/to various external devices such as a printer although not particularly illustrated. As the I/O port 213, a known connection system such as a serial port, a parallel port, or a USB can be employed at the request.

4. Information Stored in Memory 211 of Server Device 200

Figure 5A:
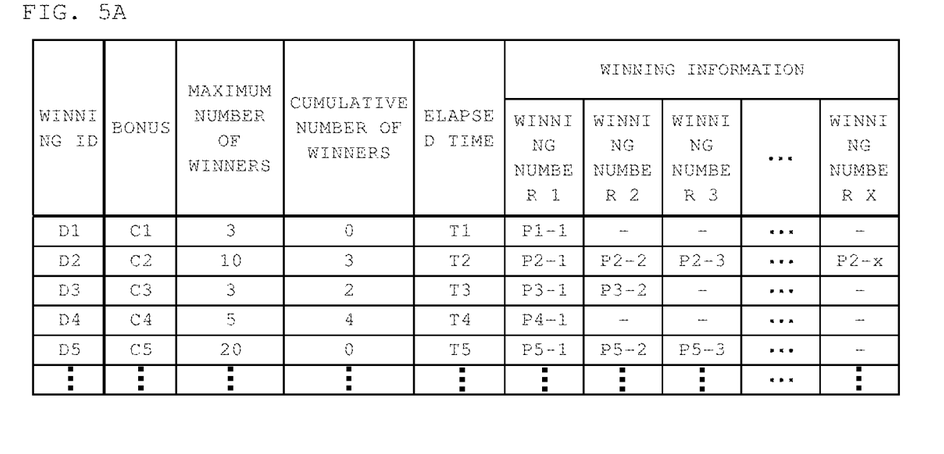
FIG. 5A is a diagram conceptually illustrating a winning information table stored in a memory of the server device according to the first embodiment of the present disclosure. Further.

FIG. 5A is a diagram conceptually illustrating the winning information table stored in the memory 211 of the server device 200 according to the first embodiment of the present disclosure. The information table stores information (huge win, win, or the like) that serves as a winning lot. To be specific, the bonus information indicating contents of the bonus to be given to the user, maximum number of winners information indicating the maximum number of people who can win a lot, a cumulative number of winners indicating the cumulative number of people who have won the lot in the past, elapsed time information indicating an elapsed time after a winning number has been first set or after the winning number has been once reset, and the winning information that is the winning number set in advance for each lot are stored for each winning lot of huge win or win in association with winning ID information.

For example, in the case where the winning ID information is a lot of D1 (huge win), C1 (giving five new characters) is stored in association with the winning ID information as the bonus content information. For the lot with the winning ID information of D1, the maximum number of winners information is stored as "3" and the cumulative number of winners information is stored as "0", and up to three people can win the lot D1. However, the table shows that no one has won the lot. In addition, the elapsed time information is T1 (0.5 hours), and indicates that 0.5 hours have elapsed after P1-1 (6-digit number) was first set as the winning information of the lot D1.

Note that, in the present embodiment, processing of increasing new winning information is performed in accordance with the elapsed time after the winning number has been first stored in the memory 211 or after the winning number has been once reset and newly stored. Therefore, for example, the winning numbers (P1-2 and P1-3: both are 6-digit numbers) are added to fields of a winning number 2 and a winning number 3 as needed every time one hour elapses as the elapsed time information and stored. In doing so, a probability of winning of the user, that is, a probability that the lottery information match any winning information can be improved as time proceeds.

Further, in the present embodiment, processing of once resetting the winning information is performed when a predetermined time has elapsed since the winning information was first stored in the memory 211 or the winning information was once reset and the new winning information is stored. The reset may be processing of rewriting the winning number with a completely new winning number, processing of performing both rewriting of the winning number and rewriting of the bonus content, or processing of deleting the winning ID information and all the information associated with the winning ID information.

Figure 5B:
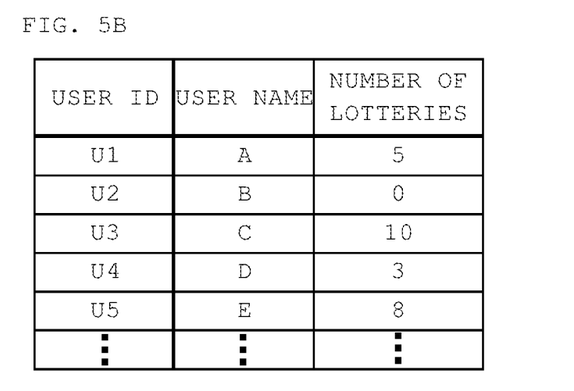
FIG. 5B is a diagram conceptually illustrating a user information table stored in the memory of the server device according to the first embodiment of the present disclosure.

FIG. 5B is a diagram conceptually illustrating the user information table stored in the memory 211 of the server device 200 according to the first embodiment of the present disclosure. The information table stores user name information and the number of lotteries information in association with user ID information. Note that information such as a character ID of the character operable by the user during execution of the application, the character name, the offensive power, and the like can be stored although not illustrated.

In the present embodiment, to limit the number of times the same user can challenge lots, the number of lotteries information is stored in association with each user ID information. For example, for a user whose user ID information is "U1", "5" is stored as the number of lotteries information, indicating that the user has drawn lots five times so far. At this time, in the case where the number of times the user can challenge lots is set to ten times in advance, the user can draw lots five more times.

Figure 8:
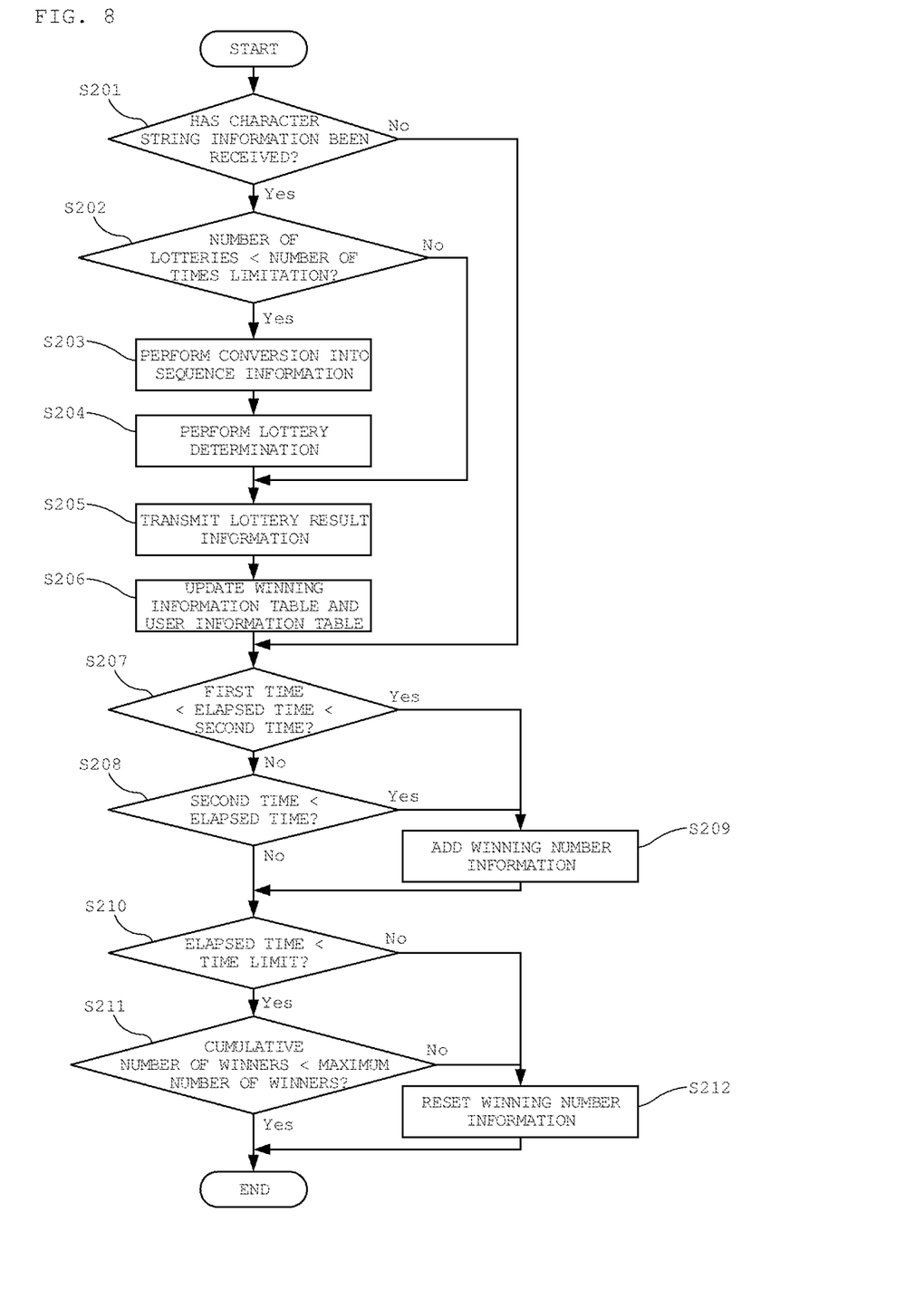
FIG. 8 is a flow diagram illustrating a processing flow executed in a server device according to the first embodiment of the present disclosure.

Note that the limit of the number of times this user can challenge lots is performed by skipping lottery determination processing with reference to the number of lotteries information in the user information table in the server device 200, as illustrated in FIG. 8, for example. However, the processing is not limited thereto, and the terminal device 100 may manage the number of lotteries information and may not transmit the input information or the lottery information to the server device 200. Even by this method, the lottery determination processing is not performed in the server device 200 as a result, and thus the number of times the user can challenge lots can be limited.

5. Processing Sequence Executed Between Terminal Device 100 and Server Device 200

Figure 6:
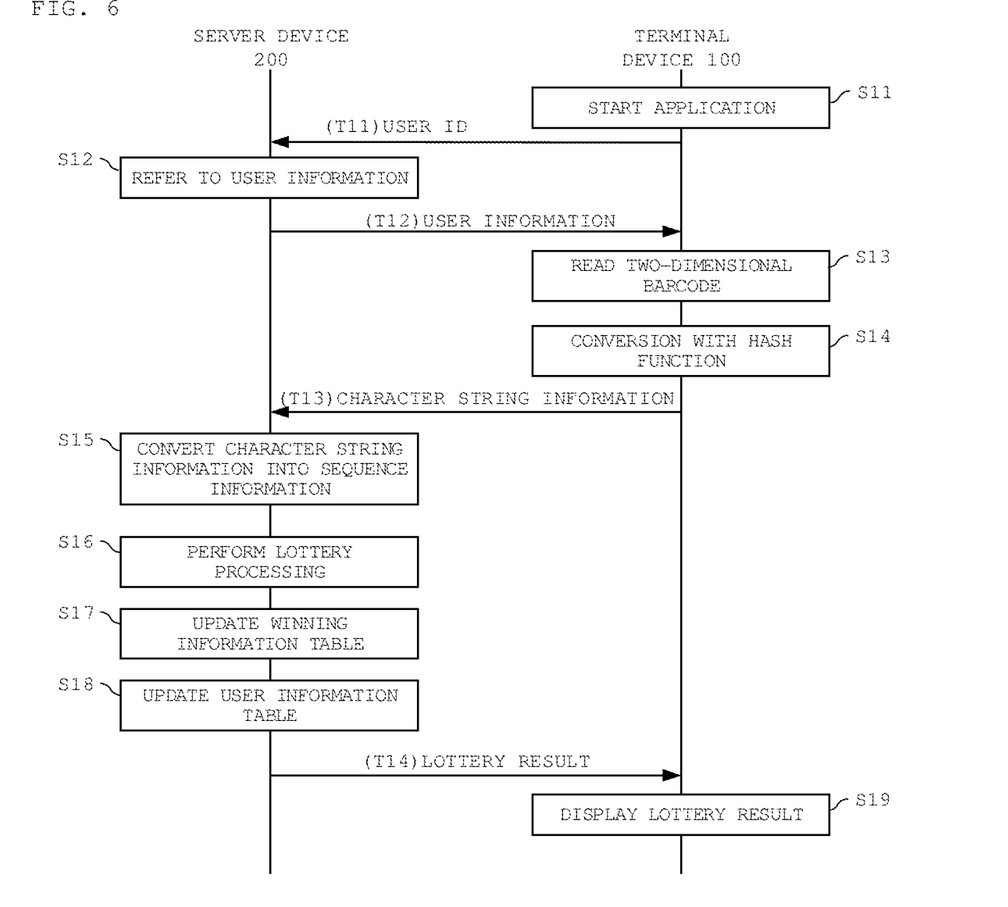
FIG. 6 is a diagram illustrating a processing sequence executed in the system according to the first embodiment of the present disclosure.

FIG. 6 is a diagram illustrating a processing sequence executed in the system 1 according to the first embodiment of the present disclosure. To be specific, the processing sequence is a processing sequence started when the application according to the present embodiment is started in the terminal device 100. The processing sequence is executed by the processor 112 of the terminal device 100 and the processor 212 of the server device 200 reading the instruction commands (programs) stored in the memories.

According to FIG. 6, when the processor 112 of the terminal device 100 detects a predetermined instruction input on the touch panel 116, the application according to the present embodiment is started (S11). After the start, the processor 112 of the terminal device 100 causes the communication interface 114 to transmit the user ID information (T11) stored in the memory 113 to the server device 200.

In the server device 200 that has received the user ID information, the processor 212 refers to the user information table (FIG. 5B) (S12). Then, the processor 212 performs authentication that the user is an authorized user of the application, and causes the communication interface 214 to transmit various types of user information (T12) necessary for execution of the application to the terminal device 100.

After receiving the user information from the server device 200, the terminal device 100 executes the two-dimensional barcode reading function included in the application, whereby the processor 112 starts the camera (input interface) and performs processing of reading the two-dimensional barcode (S13). Next, the processor 112 performs the conversion processing according to a hash function for the input information (for example, a character string indicating a URL of a web site) stored in the read two-dimensional barcode to convert the input information into character string information having a fixed length determined in advance (S14). Then, the processor 112 causes the communication interface 114 to transmit the converted character string information (T13) to the server device 200.

When receiving the character string information, the processor 212 of the server device 200 performs the processing of converting the character string information into a sequence (8 digits) having a fixed length determined in advance (S15). After that, the processor 212 performs lottery processing of determining whether the numerical information matches any of the winning numbers stored in advance in the obtained fixed-length sequence as the winning information with reference to the winning information table (FIG. 5A) (S16). After that, the processor 212 updates the winning information table and the user information table (S17 and S18), and causes the communication interface 214 to transmit lottery result information (T14) indicating a result of the lottery processing to the terminal device 100.

When receiving the lottery result information, the processor 112 of the terminal device 100 performs controls to display the lottery result on the display 111 on the basis of the received lottery result information (S19). Note that, for example, as a result of the lottery, when the user wins any of the winning information and the bonus is given to the user, the bonus information is included in the lottery result information. As a result, the user of the terminal device 100 can obtain the bonus.

6. Processing Flow in Terminal Device 100

Figure 7:
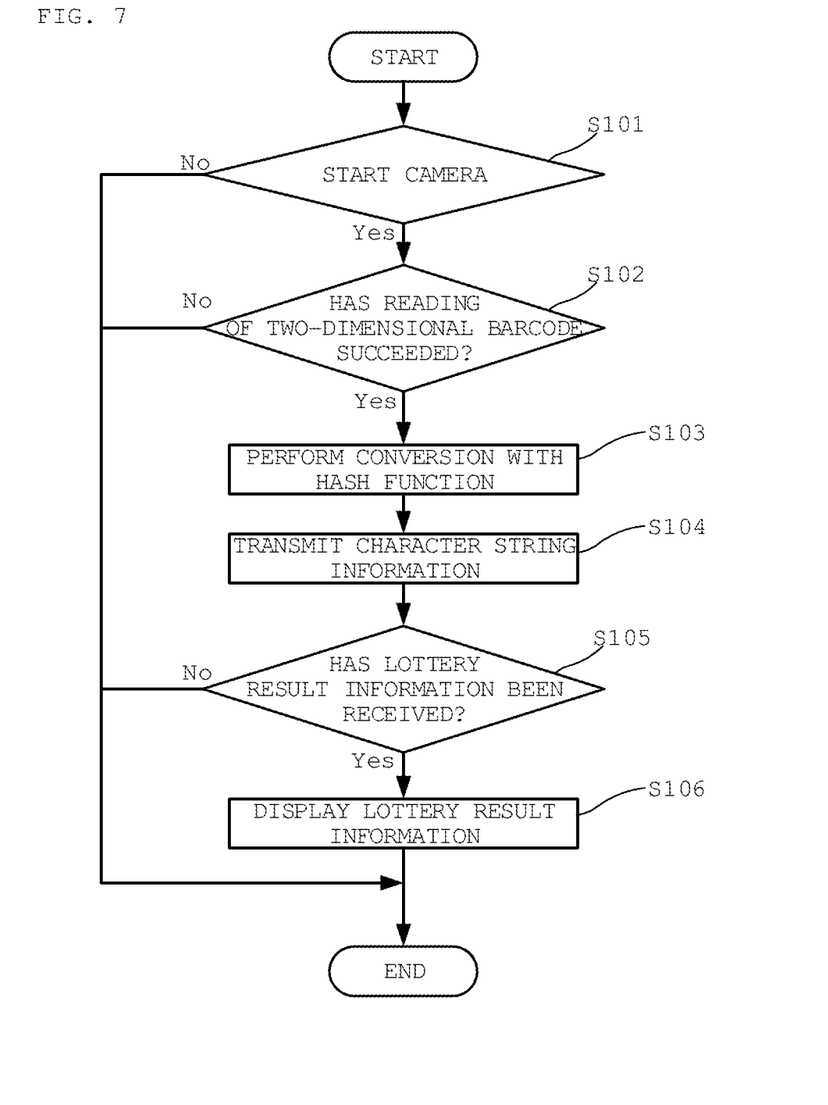
FIG. 7 is a flow diagram illustrating a processing flow executed in the terminal device according to the first embodiment of the present disclosure.

FIG. 7 is a diagram illustrating a processing flow executed in the terminal device 100 according to the first embodiment of the present disclosure. To be specific, the processing flow is started when the application according to the present embodiment is started in the terminal device 100 and the two-dimensional barcode reading function is executed. The processing flow is periodically performed by the processor 112 reading and executing the instruction commands (programs) stored in the memory 113 at predetermined intervals.

According to FIG. 7, the processor 112 determines whether the camera 117 has been started by executing the two-dimensional barcode reading function (S101).

Figure 9A:
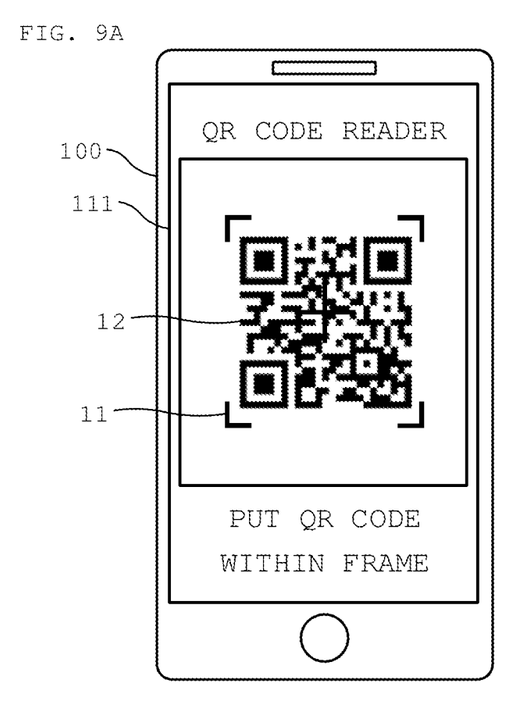
FIG. 9A is a diagram illustrating an example of a screen displayed on a display of the terminal device according to the first embodiment of the present disclosure. Further.

Here, FIG. 9A is a diagram illustrating an example of a screen displayed on the display 111 of the terminal device 100 according to the first embodiment of the present disclosure. To be specific, FIG. 9A illustrates an example of a screen displayed on the display 111 when the two-dimensional barcode reading function is executed in S101 of FIG. 7. According to FIG. 9A, an image of a two-dimensional barcode 12 input through the camera 117 is displayed on the display 111 of the terminal device 100. Further, an indicator 11 indicating an optimum angle of view for reading the two-dimensional barcode is displayed, and the user moves the terminal device 100 such that the image of the input two-dimensional barcode 12 is accommodated in the indicator 11, whereby the input information (for example, a character string indicating a URL of a web site) recorded in the two-dimensional barcode 12 is read. Note that reading the input information from the two-dimensional barcode is performed by a known method.

Returning back to FIG. 7, the processor 112 confirms whether the screen illustrated in FIG. 9A is displayed on the display 111 and the information recorded in the two-dimensional barcode has been successfully read (S102). Then, when the information has been correctly read, the processor 112 stores the read information in the memory 113 as the input information (for example, the character string indicating a URL of a web site).

Next, the processor 112 performs processing of converting the input information (for example, the character string indicating a URL of a web site) stored in the memory 113 into character string information having a fixed length determined in advance (S103). The conversion processing is processing of converting the input information composed of an arbitrary number of characters in an arbitrary character type into the character string information having a fixed length determined in advance. In the present embodiment, the conversion processing is performed on the basis of a hash function. As an example, when the conversion processing is performed using a hash function, an arbitrary character string is converted into hash value (character string) information having a fixed length such as 32 bits, 64 bits, 128 bits, 160 bits, 256 bits, or the like. At this time, if the fixed length is determined in advance, the bit number can be selected as desired. As specific conversion processing, any method can be used as long as the method is a known method using a hash function.

Next, the processor 112 causes the communication interface 114 to transmit the fixed-length character string information obtained by the conversion processing to the server device 200 (S104). After that, the server device 200 performs the lottery processing and the like, control is performed to receive lottery result information that is a result of the lottery processing, and whether receiving the lottery result information is determined (S105). Then, when the lottery result information has been received, the processor 112 causes the display 111 to display the lottery result information (S106).

Figure 9B:
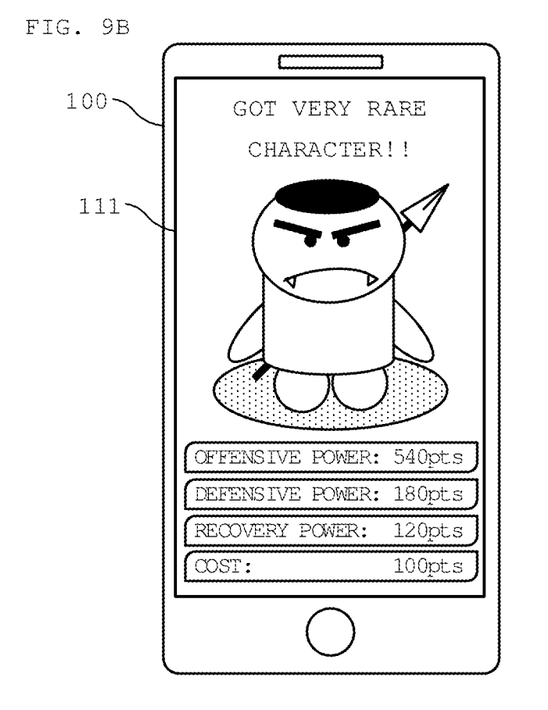
FIG. 9B is a diagram illustrating an example of a screen displayed on the display of the terminal device according to the first embodiment of the present disclosure.

Here, FIG. 9B is a diagram illustrating an example of a screen displayed on the display 111 of the terminal device 100 according to the first embodiment of the present disclosure. To be specific, FIG. 9B illustrates an example of the screen of the lottery result information displayed on the display 111 in S106 of FIG. 7. According to FIG. 9B, an example of a case in which the user has won the lot with the winning ID information of "D1" is illustrated as the lottery result information. In the lot with the winning ID information of D1, "C1" (giving five new characters) is stored as the bonus content information. Therefore, five new characters usable by the user in execution of the application are given as the bonus. FIG. 9B illustrates detailed information of one of the five given characters, as the bonus information included in the lottery result information. With the display, the user knows that the character has been given as the bonus. Note that if the user does not win any of lots as a result of the lottery, "losing" is displayed. Further, when the user wins a lot other than the lot with the winning ID information of D1, display according to the bonus content information is made.

Referring back to FIG. 7, when the lottery result information is displayed on the display 111 under the control of the processor 112, the processing flow is terminated. Note that, in the case of "No" in S101, S102, and S105, the subsequent processing is not performed, and the processing flow in the period is terminated.

7. Processing Flow in Server Device 200

FIG. 8 is a diagram illustrating a processing flow executed in the server device 200 according to the first embodiment of the present disclosure. To be specific, the processing flow is performed by receiving the character string information obtained by performing the conversion processing for the input information (the information recorded in the two-dimensional barcode) input through the input interface (camera) from the terminal device 100. Further, the processing flow is periodically performed at predetermined intervals by reading and executing the program stored in the memory 211, in the processor 212 of the server device 200.

According to FIG. 8, first, the processor 212 determines whether the character string information is received from the terminal device 100 (S201). When the server device 200 has received the character string information, the processor 212 refers to the user information table (FIG. 5B) on the basis of the user ID information transmitted together with the character string information, and acquires the number of lotteries information of the user specified with the user ID information. Then, the processor 212 compares the stored number of lotteries information with the number of times limitation information determined in advance (S202). As a result of the comparison, when the number of lotteries information has reached the limitation of the number of times, the lottery is not performed. Therefore, the processor 212 performs control to transmit information indicating that the number of lotteries information has reached the limitation of the number of times to the terminal device 100 as the lottery result information (S205).

On the other hand, when the number of lotteries information has not reached the limitation of the number of times, predetermined conversion processing is performed for the character string information received in S201 to convert the character string information into the lottery information as sequence information (S203). The conversion processing is processing for further converting the character string information as the hash value into the fixed-length sequence information (8 digits). In the present embodiment, a table that defines a correspondence relationship between a specific character string and a number in advance is stored in the memory 211, and the processor 212 converts the character string information into the fixed-length sequence information by reference to the table. Note that the conversion processing is not limited to the above method, and any of known methods can be used as long as the character string information is converted into the fixed-length sequence information.

Next, the processor 212 determines whether the lottery information obtained as the sequence information matches any winning number information stored in the winning information table as the winning information with reference to the winning information table (FIG. 5A) (S204). Note that, in this determination, the match does not mean a complete match and may be a partial match. Further, in the sequence stored as the winning number information, the match may mean the sequence matches in random, rather than match in order.

Next, the processor 212 causes the communication interface 214 to transmit the lottery result information to the terminal device 100 on the basis of the result of the determination (S205). Note that the lottery result information includes at least either the "bonus information" given when the lottery result information matches any winning number information stored in the winning information table or the "losing information" indicating that the lottery result information does not match any of the winning numbers, in addition to the information indicating that "the number of lotteries information has reached the limitation of the number of times".

Then, when the lottery information matches any winning number information in the lottery determination processing in S204, the processor 212 performs processing of adding "1" to the cumulative number of winners information of the winning ID information corresponding to the winning number information of the winning information table, and adding "1" to the number of lotteries information corresponding to the user ID information of the user information table (S206).

Here, in the present embodiment, when the cumulative number of winners has reached a maximum number of winners determined in advance, processing of resetting the winning number stored in the winning information table is performed. Further, in the present embodiment, processing of increasing a winning probability and processing of resetting the winning number are performed according to the elapsed time information indicating a time that has elapsed since the winning number information was first stored in the winning information table or the winning number information was reset.

That is, the processor 212 determines whether the elapsed time information is larger than first time information determined in advance (for example, one hour) and smaller than second time information (for example, two hours) with reference to the elapsed time information for each winning ID information stored in the winning information table (S207). As a result, in the case of "yes", one hour has elapsed since the winning number information was first stored or the winning number information was reset, and thus new winning number information is generated and is added to the winning information in order to increase the winning probability (S209). Further, in the case of "no" in S207, whether the elapsed time information is larger than the second time information (for example, two hours) is determined (S208). As a result, in the case of "yes", two hours have elapsed since the winning number information was first stored or the winning number information was reset, and thus new winning number information is generated and is added to the winning information in order to increase the winning probability (S209). Note that, in the present embodiment, the winning probability is increased in two stages using the first time information and the second time information. However, the winning probability may be increased in one stage using only the first time information or may be further increased using time information. Also, the number of pieces of the winning number information added at a time is not limited to one, and a plurality of pieces of the winning number information may be added. Further, the number of pieces of the time information to be used and the number of pieces of the winning number information to be added may be differentiated for each winning ID information. Further, the winning number information is appropriately determined by a known method, such as by randomly selecting numbers of predetermined digits.

Next, the processor 212 determines whether the elapsed time information is larger than time limit information determined in advance (for example, three hours) by reference to the elapsed time information for each winning ID information stored in the winning information table (S210). Note that a value larger than the first time information and the second time information is set to the time limit information. When the elapsed time information is larger than the time limit information, three hours have elapsed since the winning number information was first stored or the winning number information was reset, and thus all of the winning number information of the corresponding winning ID information and the elapsed time information are reset (S212).

Further, in the case of "yes" in S210, the processor 212 compares the cumulative number of winners with the maximum number of winners for each winning ID information stored in the winning information table (S211). As a result, when the cumulative number of winners has already reached the maximum number of winners, all of the winning number information of the corresponding winning ID information and the elapsed time information are reset (S212). Then, in the case of "yes" in S211, the processor 212 terminates the processing flow in the period.

As described above, in the present embodiment, the conversion processing is performed for the information (input information) recorded in the two-dimensional barcode that is a character string including an arbitrary character type, with an arbitrary number of characters, and the information (input information) is converted into a character string having a fixed length determined in advance. Therefore, in making lottery determination of a lottery or the like, distribution of a dedicated two-dimensional barcode in which the lottery information is recorded in advance is not necessary, and an arbitrary two-dimensional barcode provided by an arbitrary provider can be used for lottery. That is, more various types of information can be used for lottery. Further, in the present embodiment, the conversion processing is performed in the server device as well, and therefore it is effective for countermeasures against fraud by the user.

Second Embodiment

In the first embodiment, the conversion processing using a hash function has been performed in the terminal device 100. In a second embodiment, a terminal device 100 only reads (inputs) information recorded in a two-dimensional barcode, and conversion processing using a hash function is performed in a server device 200. Note that the present embodiment has similar configurations, processing, and procedures to the first embodiment except the points specifically described below. Therefore, detailed description of the similar matters is omitted.

As described above, in the present embodiment, the conversion processing using a hash function is performed in the server device 200. Therefore, when information recorded in a two-dimensional barcode is read in S102 of FIG. 7, a processor 112 does not perform processing in S104 and performs control to transmit the read input information to the server device 200 as it is. Then, a processor 212 of the server device 200 that has received the input information performs conversion processing for character string information having a fixed length determined in advance by a hash function before performing determination in S202. Note that a method of the conversion processing is similar to that in the first embodiment. After that, processing of S202 and subsequent steps is similarly performed to the first embodiment, using the converted character string information.

As described above, in the present embodiment, the conversion processing is performed for the information (input information) recorded in the two-dimensional barcode that is a character string including an arbitrary character type, with an arbitrary number of characters, and the information (input information) is converted into a character string having a fixed length determined in advance. Therefore, in making lottery determination of a lottery or the like, distribution of a dedicated two-dimensional barcode in which lottery information is recorded in advance is not necessary, and an arbitrary two-dimensional barcode provided by an arbitrary provider can be used for lottery. That is, more various types of information can be used for lottery. Further, in the present embodiment, the conversion processing is performed in the server device as well, and therefore it is effective for countermeasures against fraud by a user.

Third Embodiment

In the first and second embodiments, the cases in which the information stored in the two-dimensional barcode is used as the input information, and the camera is used as the input interface have been described. In a third embodiment, arbitrary character string information input by a user himself/herself is used as input information, and a touch panel 116 used by the user to input a character string is used as an input interface. Note that the present embodiment has similar configurations, processing, and procedures to the first and second embodiments except the points specifically described below. Therefore, detailed description of the similar matters is omitted.

In the present embodiment, the touch panel 116 is used as an input interface. That is, when an application according to the present embodiment is started and a character input function is executed, a processor 112 displays a character input screen on a display 111. Then, the touch panel 116 detects instructed coordinates of a user on the character input screen, and the processor 112 stores character information corresponding to the instructed coordinates. Then, the processor 112 carries out conversion processing according to a hash function in S103 of FIG. 7 for the input information of a finally input character string. Subsequent processing is similarly performed to the first embodiment.

As described above, in the present embodiment, the conversion processing is performed for the information (input information) recorded in the two-dimensional barcode that is a character string including an arbitrary character type, with an arbitrary number of characters, and the information (input information) is converted into a character string having a fixed length determined in advance. Therefore, in making lottery determination of a lottery or the like, distribution of a dedicated two-dimensional barcode in which lottery information is recorded in advance is not necessary, and an arbitrary two-dimensional barcode provided by an arbitrary provider can be used for lottery. That is, more various types of information can be used for lottery. Further, in the present embodiment, the conversion processing is performed in a server device as well, and therefore it is effective for countermeasures against fraud by a user.

The elements described in the embodiments can be appropriately combined or replaced to configure a system.

The processing and the procedures described in the present specification are not limited to the explicitly described embodiments, and can be realized by software, hardware, or a combination of the software and the hardware. To be specific, the processing and procedures described in the present specification are realized by mounting a logic corresponding to the processing to a medium such as an integrated circuit, a volatile memory, a nonvolatile memory, a magnetic disk, or an optical storage. Further, the processing and procedures described in the present specification can be mounted as a computer program and executed by various types of computers including a terminal device and a server device.

Even if description has been given such that the processing and procedures described in the present specification are executed by a single device, software, component, or module, the processing and procedures can be executed by a plurality of devices, pieces of software, components, and/or modules. Further, even if description has been given such that the various types of information described in the present specification are stored in a single memory or storage unit, such information can be distributed and stored in a plurality of memories included in a single device or a plurality of memories distributed and arranged in a plurality of devices. Further, the elements of software and hardware described in the present specification can be realized by being integrated into a smaller number of configuration elements or by being decomposed into a larger number of configuration elements.

The server device, program, method, and terminal device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A server device comprising:
a memory configured to store lottery information, winning information, and computer-readable instructions, wherein the lottery information is obtained by conversion processing for input information that is input by reading an information containing object via an input interface in a terminal device of a user, and the winning information is a predetermined character string determined in advance; and
a processor configured to execute the computer readable instructions so as to:
determine whether the lottery information matches the winning information so as to create lottery result information; and
transmit the lottery result information to the terminal device according to the determination,
wherein the input information contains no unique information directly relating to the lottery information, and
wherein the lottery information is obtained by the conversion processing using a hash function for the input information.

2. The server device according to claim 1,
wherein the input interface is a camera, and
the input information is input in the terminal device via the camera.

3. The server device according to claim 1,
wherein the information containing object is a two-dimensional barcode.

4. The server device according to claim 1,
wherein the lottery information is fixed-length character string information obtained by the conversion processing for the input information.

5. The server device according to claim 1,
wherein the conversion processing is executed in the terminal device.

6. The server device according to claim 1,
wherein the processor is configured to perform the conversion processing.

7. The server device according to claim 1,
wherein the processor is configured to periodically add new winning information in the memory after the winning information is stored in the memory.

8. A server device, comprising:
a memory configured to store lottery information, winning information, and computer-readable instructions, wherein the lottery information is obtained by conversion processing for input information that is input by reading an information containing object via an input interface in a terminal device of a user, and the winning information is a predetermined character string determined in advance; and
a processor configured to execute the computer readable instructions so as to:
determine whether the lottery information matches the winning information so as to create lottery result information; and
transmit the lottery result information to the terminal device according to the determination,
wherein the input information contains no unique information directly relating to the lottery information, and
wherein the processor is configured to periodically raise a wining probability for the lottery information after the winning information is stored in the memory.

9. The server device according to claim 1,
wherein the processor is configured to repeatedly determine whether the lottery information for the user matches the winning information at the number of times until the number of times reaches a predetermined number.

10. A computer program product embodying computer-readable instructions stored on a non-transitory computer readable storage medium for causing a computer to execute a process by a processor, the computer including a memory configured to store lottery information obtained by a predetermined conversion processing for input information that is input by reading an information containing object via an input interface in a terminal device of a user, and winning information that is a predetermined character string determined in advance,
the computer configured to perform the steps of:
determining whether the lottery information matches the winning information so as to create lottery result information; and
transmitting the lottery result information to the terminal device according to the determination,
wherein the input information contains no unique information directly relating to the lottery information, and
wherein the lottery information is obtained by the predetermined conversion processing using a hash function for the input information.

11. A method for causing a processor in a computer to execute a process, the computer including a memory configured to store lottery information obtained by performing a predetermined conversion processing for input information that is input by reading an information containing object via an input interface in a terminal device of a user, winning information that is a predetermined character string determined in advance, and computer-readable instructions,
the method comprising executing the computer-readable instructions on the processor the steps of:
determining whether the lottery information matches the winning information so as to create lottery result information; and
transmitting the lottery result information to the terminal device according to the determination,
wherein the input information contains no unique information directly relating to the lottery information, and
wherein the lottery information is obtained by the predetermined conversion processing using a hash function for the input information.

12. A terminal device comprising:
an input interface configured to accept input information by reading an information containing object;
a memory configured to store computer-readable instructions;
a communication interface configured to transmit and receive predetermined information; and
a processor configured to execute the computer-readable instructions so as to:
perform conversion processing for the input information so as to obtain lottery information;
transmit the lottery information to a server device that is communicatively connected to the terminal device via the communication interface so that after a determination is made that the lottery information matches winning information that is located in the server device, lottery result information is created; and
causing the communication interface to receive the lottery result information from the server device,
wherein the input information contains no unique information directly relating to the lottery information, and wherein the lottery information is obtained by the conversion processing using a hash function for the input information.

13. The terminal device according to claim 12, further comprising:
a display,
wherein the display is configured to display the lottery result information.

14. The terminal device according to claim 12,
wherein the input interface is a camera, and
the information containing object is a two-dimensional barcode that is captured by the camera.

15. The terminal device according to claim 12,
wherein the lottery information is fixed-length character string information obtained by the conversion processing for the input information.

16. The terminal device according to claim 12,
wherein a processor of the server device is configured to periodically add new winning information in a memory of the server device after the winning information is stored in the memory of the server device.

17. A terminal device comprising:
an input interface configured to accept input information by reading an information containing object;
a memory configured to store computer-readable instructions;
a communication interface configured to transmit and receive predetermined information; and
a processor configured to execute the computer-readable instructions so as to:
perform conversion processing for the input information so as to obtain lottery information;
transmit the lottery information to a server device that is communicatively connected to the terminal device via the communication interface so that after a determination is made that the lottery information matches wining information that is located in the server device, lottery result information is created; and
causing the communication interface to receive the lottery result information from the server device,
wherein the input information contains no unique information directly relating to the lottery information, and
wherein a processor of the server device is configured to periodically raise a wining probability for the lottery information after the winning information is stored in a memory of the server device.

18. The terminal device according to claim 12,
wherein a processor of the server device is configured to repeatedly determine whether the lottery information matches the winning information a predetermined number of times.

19. A computer program product embodying computer-readable instructions stored on a non-transitory computer readable storage medium for causing a computer to execute a process by a processor, the computer including a memory configured to store lottery information obtained by a predetermined conversion processing for input information that is input by reading an information containing object via an input interface in a terminal device of a user, and winning information that is a predetermined character string determined in advance,
the computer configured to perform the steps of:
determining whether the lottery information matches the winning information so as to create lottery result information; and
transmitting the lottery result information to the terminal device according to the determination,
wherein the input information contains no unique information directly relating to the lottery information, and
wherein the processor is configured to periodically raise a wining probability for the lottery information after the winning information is stored in the memory.

20. A method for causing a processor in a computer to execute a process, the computer including a memory configured to store lottery information obtained by performing a predetermined conversion processing for input information that is input by reading an information containing object via an input interface in a terminal device of a user, winning information that is a predetermined character string determined in advance, and computer-readable instructions,
the method comprising executing the computer-readable instructions on the processor the steps of:
determining whether the lottery information matches the winning information so as to create lottery result information; and
transmitting the lottery result information to the terminal device according to the determination,
wherein the input information contains no unique information directly relating to the lottery information, and
wherein the processor is configured to periodically raise a wining probability for the lottery information after the winning information is stored in the memory.

* * * * *